UNITED STATES PATENT OFFICE.

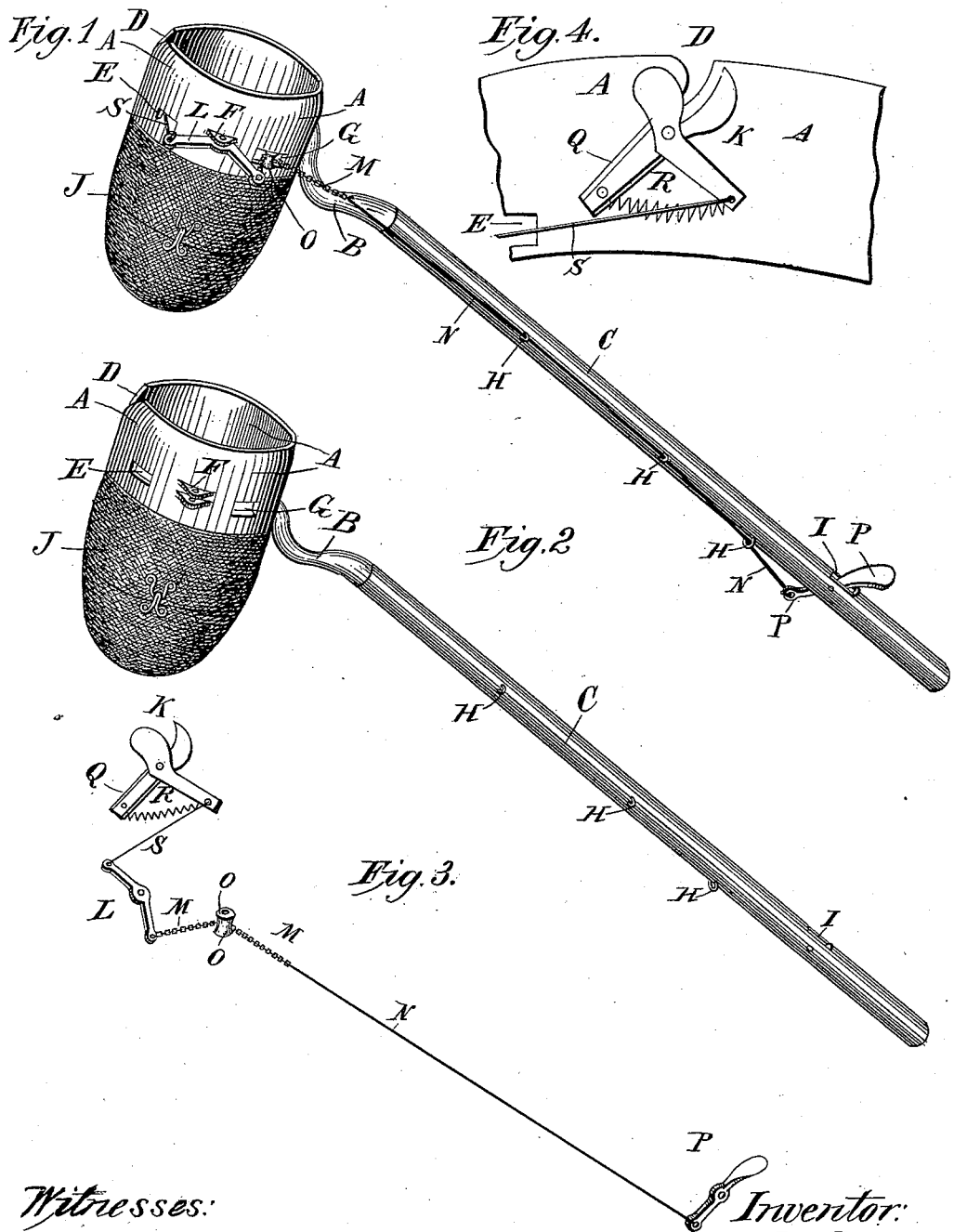

HENRY D. REAVES, OF MONTECITO, CALIFORNIA.

FRUIT-GATHERER.

SPECIFICATION forming part of Letters Patent No. 427,112, dated May 6, 1890.

Application filed September 18, 1889. Serial No. 324,354. (No model.)

*To all whom it may concern:*

Be it known that I, HENRY D. REAVES, a citizen of the United States, residing at Montecito, in the county of Santa Barbara and State of California, have invented a new and useful Tree-Fruit-Picking Tool, of which the following is a specification.

My invention relates to a working-tool. Its object is to afford facilities for picking from trees such fruit as apples, pears, oranges, lemons, &c. It is adapted especially to the picking of citrus fruit.

The principal parts of the working-tool are as follows: A flat iron ring, slightly bent at the upper part, having a sharp curved notch in the front side. The diameter of the ring is six inches and the width three inches; an iron handle bent below the ring, a wooden pole, to one end of which the ring is fastened, and a canvas bag which closes and opens at the bottom.

The working parts are as follows: A pair of shears two and three-fourths inches long, spiral spring, a bell-crank, a grooved wheel, and wire and chain.

Fig. 1 is a perspective view of the entire tool; Fig. 2, a perspective view of the tool after the working parts are removed. Fig. 3 represents all the working parts, and Fig. 4 is a view of the inside part of the ring to which the shears are bolted.

The following marked parts constitute the tool as it is seen in Figs. 2 and 3: The iron ring A, the iron handle B, the wooden pole C, the curved notch D, the opening E for the passage of the wire S, connecting the shears K with the bell-crank L, the ears F, in which the lever L is fastened by a bolt, the other opening G, for the passage of the chain M, connecting with the bell-crank L and the wire N the same opening G where the grooved wheel O is held inside the ring A by means of ears, the double tacks H, nailed in the pole to keep the wire close to it, the opening I, where the lever P is embedded, and the bag J, which has a hook and eyes on the lower part.

The following parts relate to Fig. 4: The shears K are fastened inside the ring A by bolts. The little piece of thick leather Q is placed between the shear that does not move and the ring A, in order to give the sharp shear plenty of room to move. The spiral spring R is between the shears. The shears have each a point on the lower part to hold the spiral spring R. The wire S is fastened to the sharp shear and connected with the bell-crank L.

Now I will tell how the tool is used. Hold it by the pole and catch an orange or any other fruit by the stem well in the notch D. Pull the tool a little, that the shears may be pushed against the fruit, and cut the stem by pressing your thumb on the lever P, and then let the lever fly back, for by so doing the shears will open full wide. Repeat the operation till the bag is full, and then let the fruit out by opening the bottom. In case the inside branches of a fruit-tree are too close or dense to admit the work of the bell-crank L and the wire connected with it, the working parts, except the wheel, can be removed, and the tool as it appears in Fig. 2 can be used with nearly as good result, for the sharp notch D will do the work of the shears, though a few top twigs may be broken; but the use of the shears cannot be dispensed with in picking half-ripe fruit that is to be packed and shipped.

What I claim as my invention, and desire to secure by Letters Patent of the United States, is—

In a fruit-picker, the combination of a ring having a curved notch in its edge, a handle attached to the side of the ring opposite the notch and in a plane substantially parallel with the aperture of the ring, a receptacle connected to the rear edge of the ring, shear-blades secured to the inner wall of the ring at its notched portion, a bell-crank lever pivoted on the outside wall of the ring, a connection passing through the wall of the ring and joining one arm of the bell-crank with the movable shear-blade, and connections running from the other arm within reach of the operator, substantially as set forth.

HENRY D. REAVES.

Witnesses:
W. E. DEAN,
BESSIE F. REAVES.